(12) United States Patent
Ogiso

(10) Patent No.: US 7,874,146 B2
(45) Date of Patent: Jan. 25, 2011

(54) EXHAUST GAS PURIFYING SYSTEM FOR INTERNAL COMBUSTION ENGINE AND EXHAUST GAS PURIFYING METHOD

(75) Inventor: Makoto Ogiso, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1050 days.

(21) Appl. No.: 11/632,218

(22) PCT Filed: Jun. 23, 2006

(86) PCT No.: PCT/IB2006/001719

§ 371 (c)(1),
(2), (4) Date: Jan. 11, 2007

(87) PCT Pub. No.: WO2007/029059

PCT Pub. Date: Mar. 15, 2007

(65) Prior Publication Data

US 2008/0314026 A1  Dec. 25, 2008

(30) Foreign Application Priority Data

Sep. 8, 2005  (JP) ............................. 2005-260504

(51) Int. Cl.
*F01N 3/00* (2006.01)
(52) U.S. Cl. .................. 60/286; 60/285; 60/273; 60/301
(58) Field of Classification Search ............. 60/273, 60/274, 284–286, 295, 299–301
See application file for complete search history.

(56) References Cited

U.S. PATENT DOCUMENTS 5,657,625 A * 8/1997 Koga et al. ................. 60/274

7,055,313 B2 * 6/2006 Russell ....................... 60/295
2002/0148219 A1  10/2002 Matsuoka et al.

FOREIGN PATENT DOCUMENTS

| EP | 1 154 131 A2 | | 11/2001 |
|---|---|---|---|
| JP | 06-117224 | * | 4/1994 |
| JP | 06-117224 A | | 4/1994 |

(Continued)

OTHER PUBLICATIONS

Taftan Data, Web Publication Date—Dec. 19, 2002, http://web.archive.org/web/20021219132210/http://www.taftan.com/thermodynamics/PIPE.HTM.*

*Primary Examiner*—Thomas E Denion
*Assistant Examiner*—Jesse Bogue
(74) *Attorney, Agent, or Firm*—Kenyon & Kenyon LLP

(57) ABSTRACT

An exhaust gas purifying device that is provided in an exhaust passage of an internal combustion engine and purifies exhaust gas, and a reducing agent injection valve that injects fuel to a position upstream of the exhaust gas purifying device in the exhaust passage are provided. A timing for injecting fuel from the reducing agent injection valve is adjusted to match a timing when exhaust gas discharged on an exhaust stroke of each of cylinders of the internal combustion engine reaches the position to which fuel is injected from the reducing agent injection valve. A single injection amount is changed in accordance with a condition of combustion exhaust gas that is discharged on one exhaust stroke of each of the cylinders and reaches the point to inject fuel.

5 Claims, 2 Drawing Sheets

FOREIGN PATENT DOCUMENTS

| | | | |
|---|---|---|---|
| JP | 2002-038939 | * | 2/2002 |
| JP | 2002-038939 A | | 2/2002 |
| JP | 2005-113832 A | | 4/2005 |
| JP | 2005-146979 A | | 6/2005 |
| WO | WO 99/30024 A | | 6/1999 |
| WO | WO 03/048536 A1 | | 6/2003 |

* cited by examiner

EXHAUST GAS PURIFYING SYSTEM FOR INTERNAL COMBUSTION ENGINE AND EXHAUST GAS PURIFYING METHOD

INCORPORATION BY REFERENCE

This is a 371 national phase application of PCT/IB2006/001719 filed 23 Jun. 2006, claiming priority to Japanese Patent Application No. 2005-260504 filed 8 Sep. 2005, the contents of which are incorporated herein by reference.

BACKGROUND OF THE INVENTION

1. Field of the Invention

The invention relates to an exhaust gas purifying system for an internal combustion engine, which adds a reducing agent to a portion upstream of an exhaust gas purifying catalyst that is provided in an exhaust passage of the internal combustion engine, and an exhaust gas purifying method.

2. Description of the Related Art

In a known purification technology, a storage and reduction type NOx catalyst (hereinafter referred to as "NOx catalyst") is provided in an exhaust passage of an internal combustion engine, in particular, in the exhaust passage of a diesel engine, so as to remove nitrogen oxides (hereinafter, "NOx").

When the NOx catalyst is provided in the exhaust passage, it is necessary to remove NOx or sulfur oxides (hereinafter, "SOx") stored in the NOx catalyst by discharging and reducing such substance before a NOx storage capacity of the NOx catalyst is saturated. In order to do so, an air fuel ratio of exhaust gas flowing into the NOx catalyst needs to be made rich (equal to or smaller than a stoichiometric air fuel ratio).

However, in the diesel engine, the amounts of hydrocarbon (hereinafter, "HC") and carbon monoxide (hereinafter, "CO") contained in exhaust gas are relatively small, and a chance that the air fuel ratio of exhaust gas becomes equal to or smaller than the stoichiometric air fuel ratio is very rare. Therefore, it is difficult to obtain the reducing agent, which is used for reducing oxides stored in the NOx catalyst, from exhaust gas discharged from cylinders. In order to solve this, a reducing agent injection valve is provided upstream of the NOx catalyst in the exhaust passage. The reducing agent is injected from the reducing injection valve, so that the air fuel ratio of exhaust gas flowing into the NOx catalyst becomes equal to or smaller than the stoichiometric air fuel ratio on an as-needed basis.

As described above, it has been suggested that the reducing agent is injected from the reducing agent injection valve at a timing synchronized with the exhaust stroke of the cylinders of the internal combustion engine (as an example, refer to Japanese Patent Application Publication No. JP-A-6-117224).

Various methods other than synchronization with the exhaust stroke of the cylinder of the internal combustion engine have been considered and studied so as to add the reducing agent more preferably.

SUMMARY OF THE INVENTION

It is an object of the invention to provide a technology that enables a reducing agent to be added to an exhaust passage of an internal combustion engine in a more preferable manner.

An exhaust gas purifying system for an internal combustion engine includes exhaust gas purifying means that is provided in an exhaust passage of the internal combustion engine and purifies exhaust gas and reducing agent adding means that adds the reducing agent to a position upstream of the exhaust gas purifying means in the exhaust passage. The reducing agent addition control means adjusts a timing to add the reducing agent from the reducing agent adding means to match a timing when exhaust gas discharged on an exhaust stroke of a cylinder of the internal combustion engine reaches the position to which the reducing agent is added from the reducing agent adding means 11, and changes an amount of the reducing agent per addition of the reducing agent from the reducing agent adding means in accordance with a condition of exhaust gas that is discharged on one exhaust stroke of the cylinder and reaches the position to add the reducing agent.

With this configuration, the timing when the reducing agent is added from the reducing agent adding means 11 is adjusted so as to match the timing when the exhaust gas discharged on the exhaust stroke of each cylinder of the internal combustion engine reaches the position to which the reducing agent is added from the reducing agent adding means. That is, the reducing agent is added at the timing when the reducing agent is provided to the portion at the most concentrated exhaust gas flowing in the exhaust passage. The amount of the reducing agent per addition of the reducing agent is changed in accordance with the condition of combustion exhaust gas that is discharged on one exhaust stroke of the cylinder and reaches the position to add the reducing agent. The amount of the reducing agent is optimized so that the reducing agent is more preferably mixed with exhaust gas.

Accordingly, the reducing agent in the optimized amount is timely added to exhaust gas at the most concentrated portion, and addition of the reducing agent from the reducing agent adding means becomes effective and efficient.

The condition of the combustion exhaust gas varies depending on a distance between the cylinder and the position to which the reducing agent is added, and a load of the internal combustion engine.

A distance over which the combustion exhaust gas releases heat in the exhaust passage gets longer as the distance between each of the cylinders and the position of the reducing agent adding means to add the reducing agent gets longer, and thus the temperature of combustion exhaust gas becomes lower. As the temperature of combustion exhaust gas becomes lower, it becomes difficult to obtain an amount of heat necessary for atomizing or evaporating the reducing agent, and thus the reducing agent is not sufficiently atomized or evaporated. This makes it difficult to sufficiently mix the reducing agent with combustion exhaust gas, and an amount of the reducing agent mixable with combustion exhaust gas decreases. As explained herein, the condition of combustion exhaust gas varies depending on the distance between each of the cylinders and the position to which the reducing agent is added from the reducing agent adding means.

As the load of the internal combustion engine becomes higher, the temperature of combustion exhaust gas becomes higher, and the amount of combustion exhaust gas increases. Therefore, combustion exhaust gas can be mixed with a larger amount of the reducing agent. The condition of combustion exhaust gas thus varies depending on the load of the internal combustion engine.

Accordingly, the reducing agent addition control means may determine the condition of the combustion exhaust gas depending on the distance between each of the cylinders and the position to which the reducing agent is added from the reducing agent adding means and the load of the internal combustion engine. Thus, the optimized amount of the reducing agent is added to exhaust gas by performing such addition based on a result of the determination by the control means. As a result, the reducing agent is effectively and efficiently added to exhaust gas.

The control means may reduce the amount of the reducing agent per addition of the reducing agent as the distance between each of the cylinders and the position to add the reducing agent gets longer, and increase the amount of the reducing agent as the load of the internal combustion engine increases. According to this, the amount of the reducing agent added from the reducing agent adding means can be optimized taking account of changes in the condition of combustion exhaust gas that is generated as described above.

The control means may set the amount of the reducing agent per addition of the reducing agent from the reducing agent adding means so as to be fully atomized or evaporated in the combustion exhaust gas. According to this, any surplus of the reducing agent that attaches on the wall of the exhaust passage does not exist, and the reducing agent added from the reducing agent adding means is fully mixed with exhaust gas. This makes it possible to further optimize the amount of the reducing agent added, and thus the reducing agent is added more effectively.

Further, a step may be performed to adjust a timing to add the reducing agent into a position upstream of exhaust gas purifying means in the exhaust passage to match a timing when exhaust gas discharged on the exhaust stroke of the cylinder of the internal combustion engine reaches the position to which the reducing agent is added from the reducing agent adding means. A step may also be performed to change an amount of the reducing agent per addition of the reducing agent to the portion upstream of the exhaust gas purifying means in the exhaust passage in accordance with a condition of combustion exhaust gas that is discharged on one exhaust stroke of the cylinder and reaches the position to add the reducing agent. According to these steps, any surplus of the reducing agent that attaches to the wall of the exhaust passage does not exist, and the reducing agent added from the reducing agent adding means is fully mixed with exhaust gas. This makes it possible to further optimize the amount of the reducing agent added from the reducing agent adding means, and thus the reducing agent is added more effectively.

According to the invention, the reducing agent can be added to the exhaust passage of the internal combustion engine in a more suitable manner.

BRIEF DESCRIPTION OF THE DRAWINGS

The above mentioned and other features, advantages, technical and industrial significance of this invention will be better understood by reading the following detailed description of exemplary embodiments of the invention, when considered in connection with the accompanying drawings, in which.

DETAILED DESCRIPTION OF THE EXEMPLARY EMBODIMENTS

Figure 1:
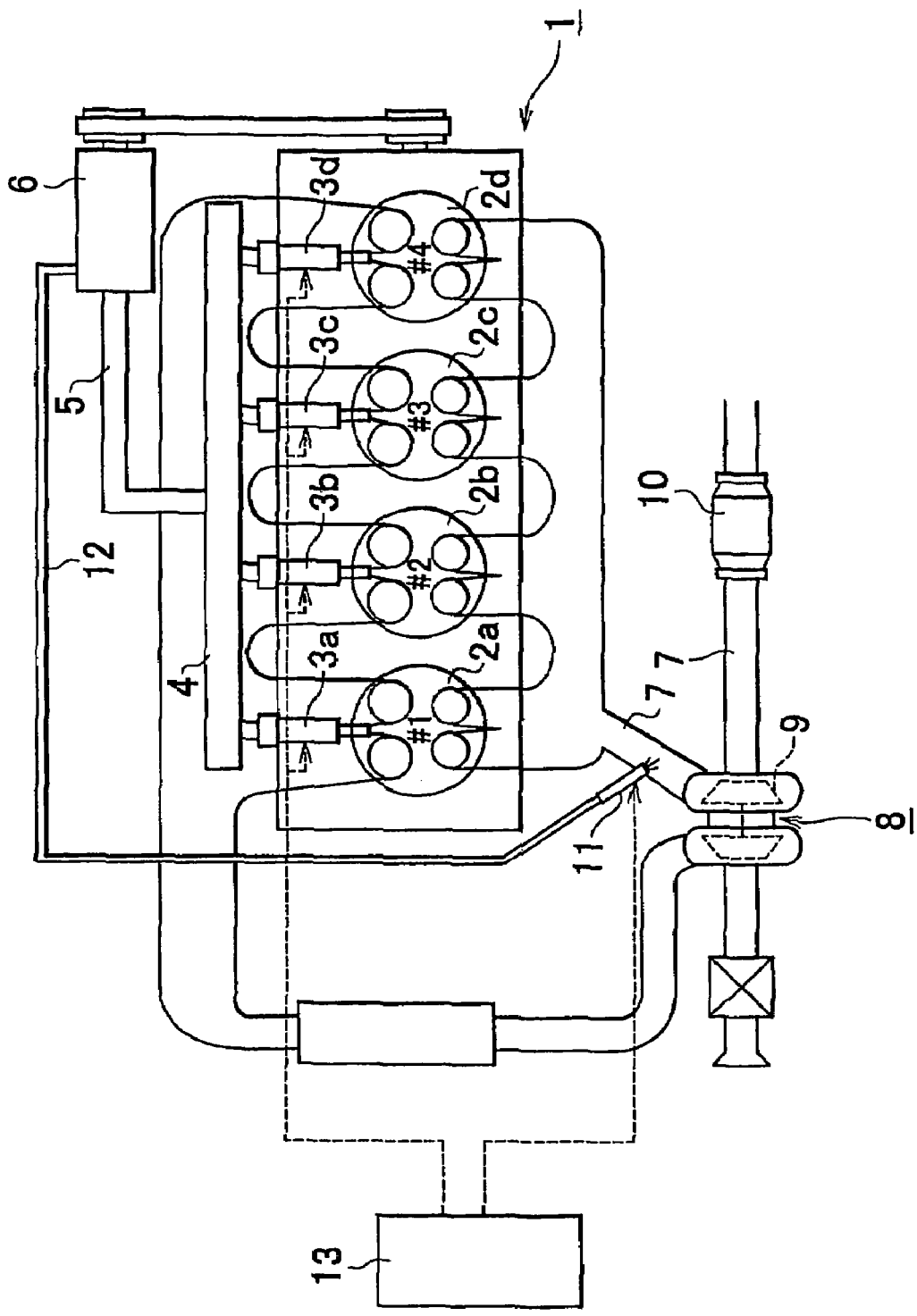
FIG. 1 is a diagram schematically showing configurations of an internal combustion engine to which an exhaust gas purifying means according to an embodiment of the invention is applied, and an intake/exhaust system thereof.

FIG. 1 is a diagram schematically showing configurations of an internal combustion engine to which an exhaust gas purifying means according to an embodiment of the invention is applied, and an intake/exhaust system thereof.

An internal combustion engine 1 shown in FIG. 1 is a water-cooled four-cycle diesel engine that includes four cylinders of a first cylinder (#1) to a fourth cylinder (#4), which are denoted as 2a, 2b, 2c, and 2d, respectively (hereinafter collectively referred to as "cylinders 2" in some cases). The internal combustion engine 1 also includes fuel injection valves 3a, 3b, 3c, and 3d (hereinafter collectively referred to as "fuel injection valves 3" in some cases) that directly inject fuel into a combustion chamber of each of the cylinders 2. Each of the fuel injection valves 3 is connected to an accumulator (common rail) 4, and the common rail 4 communicates with a fuel pump 6 via a fuel supply pipe 5.

An exhaust passage 7 of the internal combustion engine 1 is defined by exhaust ports for the cylinders 2 of the internal combustion engine 1, an exhaust manifold, and an exhaust pipe. The exhaust passage 7 is connected to a muffler (not shown) at a position downstream in the exhaust passage 7. In midstream of the exhaust passage 7, a turbine housing 9 of a turbocharger 8 is provided, and an exhaust gas purifying device 10 (exhaust gas purifying means) for purifying exhaust gas discharged from the cylinders 2 is provided at a position downstream of the turbine housing 9 in the exhaust passage 7. The exhaust gas purifying device 10 includes a NOx storage reduction catalyst supported by a filter that captures particulate matters (PM), such as soot discharged from the internal combustion engine 1. Further, the exhaust gas purifying device 10 may be configured such that the filter and the NOx catalyst is arranged in one row, or the filters and the NOx catalysts are arranged as a multilayer.

A reducing agent injection valve 11 (reducing agent adding means) is provided upstream of the turbine housing 9 in the exhaust passage 7. The reducing agent injection valve 11 supplies fuel which serves as a reducing agent into exhaust gas flowing in the exhaust passage 7, and is connected to the fuel pump 6 through a fuel passage 12.

In the internal combustion engine 1 configured as above, an electronic control unit (ECU) 13 for controlling the internal combustion engine 1 is provided. The ECU 13 is a control computer that is constituted by a CPU, a ROM, a RAM, a backup RAM, and the like.

The ECU 13 is connected to the fuel injection valves 3 and the reducing agent injection valve 11 via an electric wiring. The ECU 13 is able to control fuel supply, stop of the fuel supply, and an amount of fuel supplied from the fuel injection valves 3 and the reducing agent injection valve 11.

The ECU 13 executes, for example, input of output signals from sensors and calculations of engine speed, the amount of fuel supplied, a timing of fuel supply, and the like, in a basic routine that is executed at every predetermined cycle. Signals input by the ECU 13 and control values calculated and obtained by the ECU 13 in the basic routine are temporarily stored in the RAM of the ECU 13.

The ECU 13 reads out the control values stored in the RAM at an interrupt that is triggered by input of signals from sensors and switches, a lapse of a certain time, or input of a pulse signal from a crank position sensor. Then, the ECU 13 controls the fuel injection valves 3, the reducing agent injection valve 11, and the like in accordance with the control values.

The ECU 13 operates in accordance with an application program stored in the ROM and executes fuel injection from the reducing agent injection valve 11. The ECU 13 performs a process to reduce NOx, a process to detoxify SOx, a process to oxidize and remove PM, and the like using the exhaust gas purifying device 10.

In the process to reduce NOx, fuel, which serves as the reducing agent, is injected from the reducing agent injection valve 11 to exhaust gas, so that an air fuel ratio of exhaust gas flowing to the NOx catalyst provided in the exhaust gas purifying device 10 is changed to be rich, whereby NOx stored in the NOx catalyst is discharged and reduced. As the process to detoxify SOx, fuel, which serves as the reducing agent, is injected from the reducing agent injection valve 11 to exhaust gas when a temperature of the catalyst is within a range of 600° C. to 800° C., so that the air fuel ratio of exhaust gas flowing to the NOx catalyst of the exhaust gas purifying device 10 is changed to be rich, whereby SOx stored in the NOx catalyst is discharged and reduced. As the process to oxidize and remove PM, fuel, which serves as the reducing agent, is injected from the reducing agent injection valve 11 to exhaust gas, so that unburned fuel component is oxidized by the NOx catalyst of the exhaust gas purifying device 10, and heat generated by the oxidization increases the temperature of the filter so that PM captured by the filter is removed.

When fuel is injected from the reducing agent injection valve 11 in all the processes above, it is preferable to sufficiently mix fuel injected with exhaust gas. In the embodiment according to the invention, a timing of fuel injection is optimized taking account of a flow of exhaust gas discharged from the internal combustion engine 1, and an amount of single fuel injection from the reducing agent injection valve 11 ("single injection amount") is optimized.

In other words, the timing to inject fuel front the reducing agent injection valve 11 is adjusted to match the timing when exhaust gas discharged on an exhaust stroke of each of the cylinders 2 of the internal combustion engine 1 reaches a position to which fuel is injected from the reducing agent injection valve 11 (fuel injection position). In addition, the single injection amount of the reducing agent injection valve 11 is changed in accordance with a condition of combustion exhaust gas that is discharged on one exhaust stroke of the cylinders 2 and reaches the fuel injection position.

The combustion exhaust gas herein means exhaust gas that is discharged on one exhaust stroke of the cylinders 2 and reaches the fuel injection position of the reducing agent injection valve 11.

The condition of the combustion exhaust gas varies depending on a distance between each of the cylinders 2 and the fuel injection position of the reducing agent injection valve 11, and a load of the internal combustion engine 1.

The reason for the above is as follows: a distance over which the combustion exhaust gas releases heat in the exhaust passage 7 gets longer as the distance between each of the cylinders 2 and the fuel injection position of the reducing agent injection valve 11 gets longer, and thus the temperature of combustion exhaust gas becomes lower. As the temperature of combustion exhaust gas becomes lower, it becomes difficult to obtain an amount of heat necessary for atomizing or evaporating fuel, and thus fuel is not sufficiently atomized or evaporated. This makes it difficult to sufficiently mix fuel with combustion exhaust gas, and an amount of fuel mixable with combustion exhaust gas decreases. As explained herein, the condition of combustion exhaust gas varies depending on the distance between each of the cylinder 2 and the fuel injection position of the reducing agent injection valve 11.

As the load of the internal combustion engine 1 becomes higher, the temperature of combustion exhaust gas becomes higher, and the amount of combustion exhaust gas increases. Therefore, combustion exhaust gas can be mixed with a larger amount of fuel. The condition of combustion exhaust gas thus varies in accordance with the load of the internal combustion engine 1.

As described above, since the condition of combustion exhaust gas varies, the amount of fuel injected from the reducing agent injection valve 11 is reduced as the distance between each of the cylinders 2 and the fuel injection position becomes longer. On the other hand, the amount of fuel is increased as the load of the internal combustion engine 1 becomes larger. For example, in the embodiment according to the invention, the single injection amount of the reducing agent injection valve 11 is made smaller for combustion exhaust gas which has been discharged from the fourth cylinder (#4) 2d and reached the fuel injection position than for combustion exhaust gas which has been discharged from the first cylinder (#1) 2a and reached the fuel injection position.

In addition, the single injection amount of the reducing agent injected from the reducing agent injection valve 11 is set so as to be fully atomized or evaporated in combustion exhaust gas. By setting the amount of fuel as described above, any surplus of fuel that attaches on the wall of the exhaust passage 7 does not exist, and the fuel injected from the reducing agent injection valve 11 is fully mixed with exhaust gas. This makes it possible to further optimize the amount of fuel injected from the reducing agent injection valve 11, and thus fuel is injected more effectively.

As described above, fuel is injected from the reducing agent injection valve 11 at the timing when fuel is injected to the portion with the most concentrated exhaust gas flowing in the exhaust passage 7. The single injection amount is changed in accordance with the condition of combustion exhaust gas. The single injection amount is set to the amount that is suitable for being fully atomized or evaporated in combustion exhaust gas.

Figure 2:
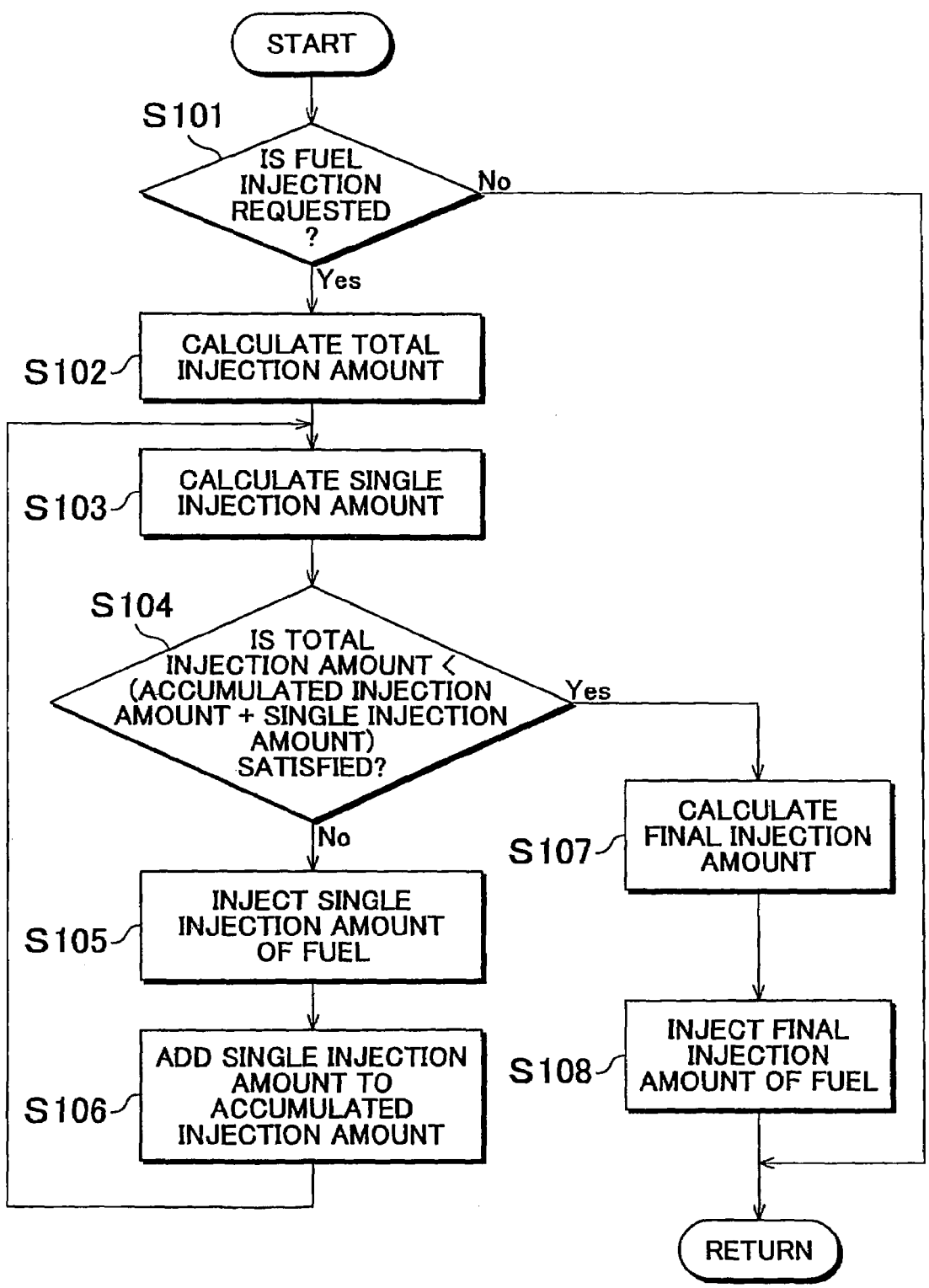
FIG. 2 is a flowchart showing a control routine that performs fuel injection from a reducing agent injection valve according to the embodiment of the invention.

Specifically, in the embodiment according to the invention, the ECU 13 performs fuel injection from the reducing agent injection valve 11 into the exhaust passage 7 in accordance with the control flow as shown in FIG. 2. The flow shows a routine that is executed by the ECU 13 as an interrupt that is performed at a certain cycle or triggered by input of the pulse signals from the crank position sensor and the like. The flow will be described below with reference to the flowchart shown in FIG. 2.

The control routine is previously stored in the ROM of the ECU 13. First, in step (hereinafter simply referred to as "S") 101, the ECU 13 determines whether a request for fuel injection from the reducing agent injection valve 11 is made. When the process to reduce NOx, the process to detoxify SOx, or the process to oxidize and remove PM as described above is requested, YES is determined, and the process proceeds to S102. When the processes above are not requested, etc., NO is determined and the routine is then terminated.

In S102, the ECU 13 calculates a "total injection amount" to be injected from the reducing agent injection valve 11 in response to the request for each of the aforementioned processes. The "total injection amount" denotes total of amounts of fuel injected from the reducing agent injection valve 11 that are necessary for completing the aforementioned processes. The calculated total injection amount is stored in the RAM of the ECU 13.

In S103 following S102, the ECU 13 calculates a "single injection amount", which is injected to exhaust gas that is discharged on the exhaust stroke of one of the cylinders 2 and reaches the fuel injection position of the reducing agent injection valve 11. In the embodiment according to the invention, the single injection amount is calculated based on the distance between each of the cylinders 2 which are currently on the combustion stroke and the fuel injection position, the load of the internal combustion engine 1, and the amount of fuel atomizable or evaporable in combustion exhaust gas. Thus, the single injection amount varies depending on which cylinder among the cylinders 2a through 2d discharges exhaust gas. Even with the same cylinder, the single injection amount differs in each fuel injection. The calculated single injection amount is stored in the RAM of the ECU 13.

In S104 following S103, the ECU 13 determines whether the total injection amount is smaller than a sum of an "accumulated injection amount" and the single injection amount for the next cycle (total amount of fuel<(accumulated injection amount+single injection amount)). The "accumulated injection amount" is obtained by accumulating the amounts of fuel injected up to present since the request for fuel injection has been made. If NO is determined, the process proceeds to S105. If YES is determined, the process proceeds to S107.

In S105, the ECU 13 executes the single injection amount of fuel injection. The timing to inject fuel from the reducing agent injection valve 11 is adjusted to match the timing when exhaust gas discharged on the exhaust stroke of the cylinders 2 reaches the fuel injection position of the reducing agent injection valve 11. As described above, the amount of fuel differs among the cylinders 2, and even for the same cylinder, the amount of fuel differs in each fuel injection. In other words, in S103, the present single injection amount is calculated in accordance with combustion in a given cylinder of the cylinders 2 in the present cycle, and the calculated single injection amount of fuel is injected at the timing when exhaust gas discharged after explosion in the above cylinder in the present cycle reaches the fuel injection position of the reducing agent injection valve 11.

In S106 following S105, the ECU 13 adds the single injection amount that has already been injected to the accumulated injection amount. The accumulated injection amount is stored in the RAM of the ECU 13. When S106 is performed and completed, the process goes on to S103 again.

In S107, the ECU 13 calculates a "final injection amount" for the next fuel injection by subtracting the accumulated injection amount from the total injection amount (final injection amount=total injection amount−accumulated injection amount). The final injection amount is stored in the RAM of the ECU 13.

In S108 following S107, the ECU 13 executes fuel injection of the final injection amount. Fuel is injected from the reducing agent injection valve 11 at the timing when exhaust gas discharged on the exhaust stroke of each of the cylinders 2 of the internal combustion engine 1 reaches the fuel injection position of the reducing agent injection valve 11. In other words, the final injection amount is calculated, and the calculated final injection amount of fuel is injected at the timing when exhaust gas discharged from each of the cylinders 2 reaches the fuel injection position of the reducing agent injection valve 11. The routine is then terminated.

As described above, in the processes performed in the exhaust purifying device 10 (the process to reduce NOx, the process to detoxify SOx, and the process to oxidize and remove PM), when fuel is injected from the reducing agent injection valve 11, the timing of fuel injection and the amount of fuel are optimized so that fuel is injected from the reducing agent injection valve 11 more effectively, efficiently, and further optimally.

In the embodiment above according to the invention, the reducing agent injection valve 11 for injecting fuel into the exhaust passage 7 is provided. The invention may be applied to fuel injection in which fuel is injected from the fuel injection valves 3 that inject fuel into the cylinders 2 of the internal combustion engine 1, while exhaust gas is discharged from the valves ("after" injection). The amount of fuel for fuel injection is determined so as to be fully atomized or evaporated in accordance with the load of the internal combustion engine 1.

The invention claimed is:

1. An exhaust gas purifying system for an internal combustion engine comprising:
   an exhaust gas purifying device that is provided in an exhaust passage of the internal combustion engine and purifies exhaust gas;
   a reducing agent adding device that adds a reducing agent to a position upstream of the exhaust gas purifying device in the exhaust passage; and
   a control device that adjusts a timing to add the reducing agent from the reducing agent adding device to match a timing when exhaust gas discharged on an exhaust stroke of a cylinder of the internal combustion engine reaches the position to which the reducing agent is added from the reducing agent adding device, and that changes an amount of the reducing agent per addition of the reducing agent from the reducing agent adding device in accordance with a condition of exhaust gas that is discharged on one exhaust stroke of the cylinder and reaches the position to add the reducing agent.

2. The exhaust gas purifying system for the internal combustion engine according to claim 1, wherein:
   the control device determines the condition of the combustion exhaust gas based on a distance between the cylinder and the position to which the reducing agent is added, and a load of the internal combustion engine.

3. The exhaust gas purifying system for the internal combustion engine according to claim 2, wherein:
   the control device reduces the amount of the reducing agent per addition of the reducing agent as the distance between the cylinder and the position to add the reducing agent gets longer, and increases the amount of the reducing agent as the load of the internal combustion engine increases.

4. The exhaust gas purifying system for the internal combustion engine according to claim 1, wherein:
   the control device sets the amount of the reducing agent per addition of the reducing agent added from the reducing agent adding device to be fully atomized or evaporated in the combustion exhaust gas.

5. An exhaust gas purifying method for an internal combustion engine, comprising the steps of:
   adjusting a timing to add a reducing agent into a position upstream of an exhaust gas purifying device in an exhaust passage to match a timing when exhaust gas discharged on an exhaust stroke of a cylinder of the internal combustion engine reaches the position to which the reducing agent is added from a reducing agent adding device; and
   changing an amount of the reducing agent per addition of the reducing agent to the position upstream of the exhaust gas purifying device in the exhaust passage in accordance with a condition of combustion exhaust gas that is discharged on one exhaust stroke of the cylinder and reaches the position to add the reducing agent.

* * * * *

UNITED STATES PATENT AND TRADEMARK OFFICE
CERTIFICATE OF CORRECTION

| | |
|---|---|
| PATENT NO. | : 7,874,146 B2 |
| APPLICATION NO. | : 11/632218 |
| DATED | : January 25, 2011 |
| INVENTOR(S) | : Makoto Ogiso |

It is certified that error appears in the above-identified patent and that said Letters Patent is hereby corrected as shown below:

| Column | Line | |
|---|---|---|
| 5 | 23 | Change "fuel front" to --fuel from--. |

Signed and Sealed this
Third Day of May, 2011

David J. Kappos
*Director of the United States Patent and Trademark Office*